Jan. 19, 1926.  
A. A. CLOKEY  
TELEGRAPH SYSTEM  
Filed Oct. 15, 1920  
1,570,460  
2 Sheets-Sheet 1
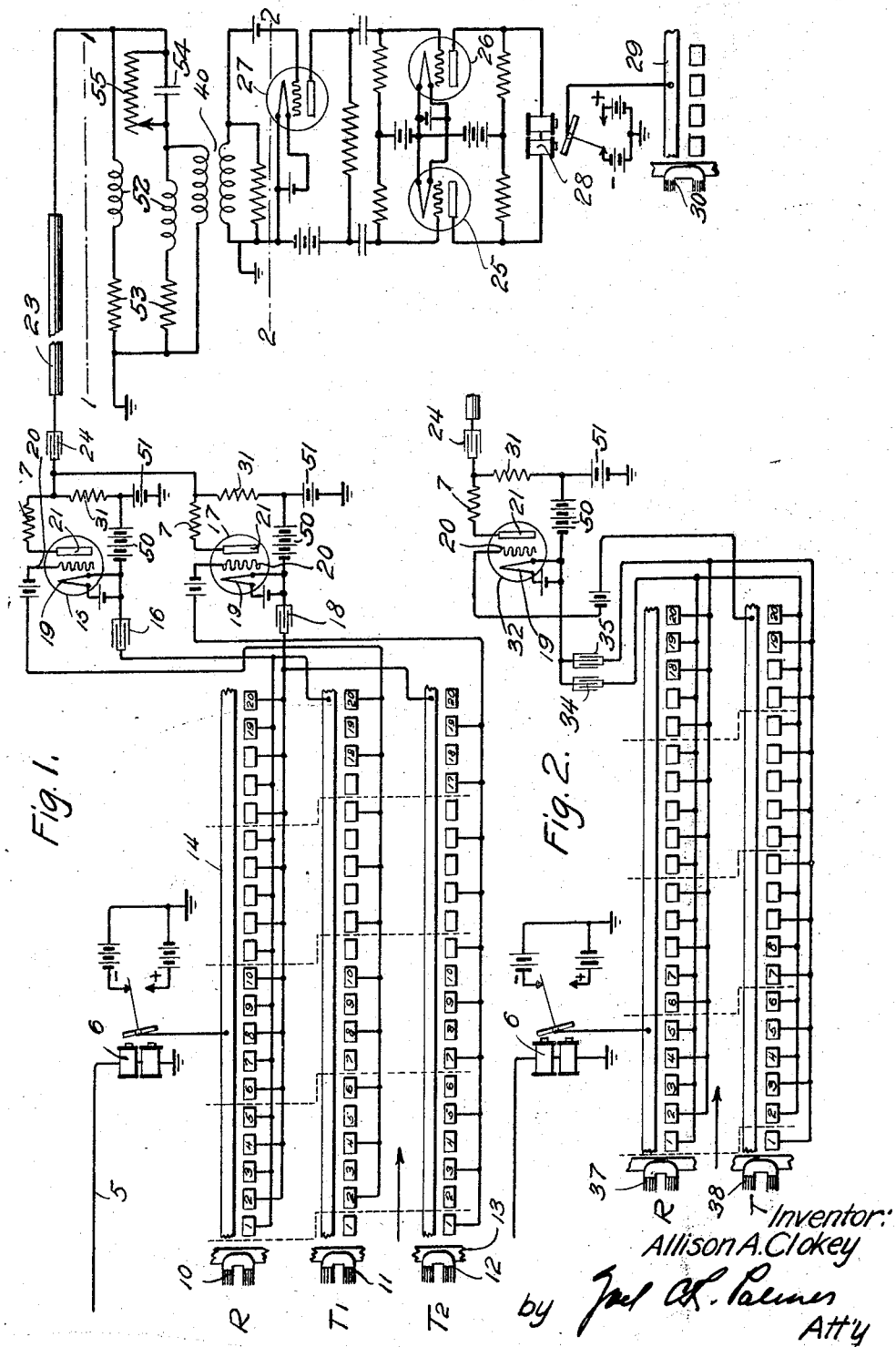
Inventor:
Allison A. Clokey
by Joel A. Palmer
Att'y

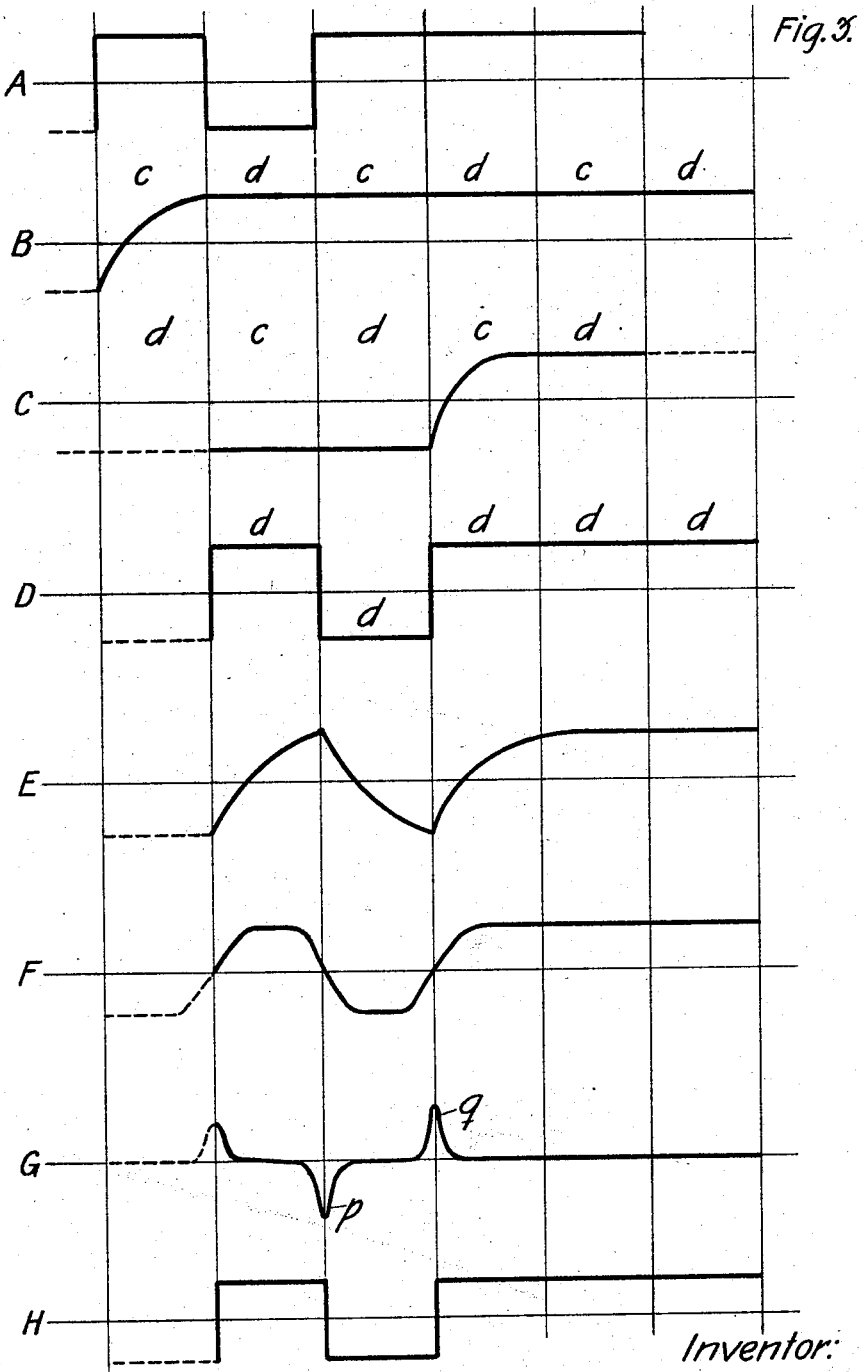

Patented Jan. 19, 1926.

1,570,460

UNITED STATES PATENT OFFICE.

ALLISON A. CLOKEY, OF RUTHERFORD, NEW JERSEY, ASSIGNOR TO WESTERN ELECTRIC COMPANY, INCORPORATED, OF NEW YORK, N. Y., A CORPORATION OF NEW YORK.

TELEGRAPH SYSTEM.

Application filed October 15, 1920. Serial No. 417,198.

*To all whom it may concern:*

Be it known that I, ALLISON A. CLOKEY, a citizen of the United States, residing at Rutherford, in the county of Bergen, State of New Jersey, have invented certain new and useful Improvements in Telegraph Systems, of which the following is a full, clear, concise, and exact description.

This invention relates to telegraph systems, and more particularly to systems for automatically repeating telegraphic signals from a transmission line of one character to a line having different transmission characteristics, as from a land line to an ocean cable and vice versa.

Hitherto the automatic repetition of signals between land lines and ocean cables comprising circuits where reception is accomplished by electro-mechanical printing devices has not been considered feasible mainly because of the great differences in the physical characteristics of the two transmitting media making it necessary to employ different codes for reasons of economy. In the case of the submarine cable limit, the maximum speed of signaling is much lower than the speed at which it is economical to operate a land line.

Recent improvements in submarine cable construction, particularly improvements in methods of loading such cables, have so greatly increased the speed of signaling thereover as to make the use of the ordinary Morse or Baudot codes for ocean cable telegraphy, and the direct repetition of signals between land lines and ocean cables seem feasible provided a suitable distortionless repeating system is available.

The object of this invention is to repeat telegraphic or other signal impulses in a novel and efficient manner. The invention utilizes a three element electric discharge device, such as the well known audion or thermionic relay operating by pure electron discharge or similar three element tubes operating with ionized gas, the potential of the grid or control electrode being regulated by a suitable receiving relay. The electric discharge device or devices, depending upon the character of the service, are interposed for example between the incoming end of a land line and the outgoing end of a submarine cable or vice versa. A distributor of the multiplex printing telegraph type is in the form of the invention chosen for illustration, suitably connected intermediate the discharge device and the receiving relay. Associated with the discharge device or devices is a condenser, or equivalent device, which is arranged to receive a charge in accordance with the received signal current impulses and subsequently permitted to discharge and control the discharge device.

A better understanding of the invention may be had from the following description and the annexed claims when considered in conjunction with the accompanying drawing in which Fig. 1 shows one embodiment of the invention, Fig. 2 illustrates a modification of Fig. 1, while Fig. 3 represents various forms of the signal current impulse.

Referring now to the drawing and the particular embodiments illustrated therein, there is shown in Fig. 1 the incoming end of a land line 5 which extends from a distant station (not shown) at which suitable transmitting mechanism such as the well known Baudot or Multiplex type of transmitter is located. Connected with the line 5 is the usual type of polarized relay 6 which is adjusted to be free from bias, and which will hereinafter be termed the line relay. Across the contacts of this line relay 6 is connected a split battery with the central point thereof connected to ground so that upon the engagement of the armature with one contact it is made positive with respect to ground and when against the other is made negative with respect to ground. In order that the signals will be transmitted or relayed in the order in which they are received a suitable rotary distributor of the multiplex type is provided. This distributor is provided with three separate and distinct sections or sets of rings designated by the characters R, $T_1$ and $T_2$. The characters R, $T_1$ and $T_2$ respectively indicate receiving, transmitting section number one and transmitting section number two of a distributor, and as shown may be considered as a developed view of a rotary distributor. Each section or set of rings comprises a solid and a segmented ring. The solid rings are adapted to be bridged with the segmented ring by suitable brushes such as 10, 11 and 12. These brushes are mounted on a brush arm 13 which is adapted to be moved in the direction of the arrow. This arm 13, as in the usual type of distributor, is connected through a friction clutch with what is termed a distributor motor and is designed to be continuously revolved.

The armature of the line relay 6 is connected with the solid ring 14; thus current of a polarity depending upon that of the received signal will be applied thereto. All of the odd number segments of the ring associated therewith are connected together, the entire group being serially connected to the input circuit of an audion or other electric discharge device 15 through a condenser 16. The even numbered segments are also connected together, the entire group being connected with an audion 17 through a condenser 18.

The audions 15 and 17 comprise the usual heated filament 19, the grid or control electrode 20, and the plate electrode 21. The grid electrode of the audion 15 is connected with the even numbered segments of the segmented ring forming a part of the section designated by the character $T_1$, the filament circuit being also connected with the solid ring thereof. Thus, upon the passage of the brush 11 over a segment to which the grid or control electrode 20 of the audion 15 is connected, a circuit will be completed including the condenser 16 with this electrode. Should the condenser 16 at this time be charged, the charge upon the grid electrode 20 will be varied. As in the case of the audion 15, the respective electrodes of the audion 17 are connected with the odd numbered segments of the section designated by the character $T_2$.

From the above it is evident that the invention provides a complete overlap in that the condensers associated with the respective tubes are charged in accordance with the received signal upon the passage of the brush 10 over a segment to which it is connected and subsequently discharged for causing the operation of the respective audion. If, for example, the condenser 16 had been charged upon the passage of brush 10 over segment 1 of the receiving section R, it will not be permitted to discharge through the input circuit of the audion 15 until the brush 11 engages segment 2 of the section designated by the character $T_1$.

The output circuits of the respective audions are connected with the outgoing end of a cable 23 through the usual sending condenser 24. The output circuit of each of the audions 15, 17 comprises a battery 50, a resistance 31 and a second resistance 7, a second battery 51 being connected between the ground and the resistance 31. Battery 51 and resistances 7 and 31 are preferably so adjusted that the effects of batteries 50 and 51 will be balanced with respect to the cable so that no current flow therein will take place. When the potential of the grid changes, an unbalance is produced resulting in the setting up of a current in the cable, the direction of this current depending upon whether the potential of the grid is raised or lowered from the value producing the no-current condition. Connected with the other end of the cable is a receiving network comprising a distortion correcting network and suitable amplifiers for amplifying the received signal. The distortion correcting network is shown between the broken lines 1—1 and 2—2 and consists of shunt paths containing inductances 52 and resistances 53 between which paths and serially related with the cable are condenser 54 with resistance 55 in shunt thereto. The function of this network is to derive from the arrival current other currents differing therefrom in wave form. The effect of the derived currents when added to the incoming current will be to produce a signal current having a wave shape closely resembling that impressed at the other end of the cable, the function of the correcting network being to correct for the signal distortion introduced by the cable. A more complete description of networks of this type may be found in British Patent No. 153,357.

In order that the amplification of all signals will be symmetrical, two amplifiers such as 25 and 26 are provided. These amplifiers are suitably connected to the output circuit of a single amplifier 27 which is associated with the distortion correcting network by means of transformer 40. The operation of amplifiers for this purpose is well known and a further description is considered unnecessary in this application. Amplifiers of this type are more fully described in the U. S. patent to E. H. Colpitts, No. 1,128,292. A receiving relay 28 is associated with the output circuits of two audions 25 and 26. Across the contacts of this relay is a split battery, the central point of which is grounded. To the armature of this relay there is connected the solid ring 29 of the usual receiving distributor comprising a brush 30 and suitable motive power for rotating the same. It is, of course, understood that suitable printer mechanism may be associated with the receiving distributor which, for the sake of avoiding complications in the drawing, has been omitted. This mechanism, will, of course, be operated in accordance with the signals received by the line relay 6 which are subsequently repeated to the cable 23 where they pass through the distortion correcting network and the amplifiers 25 and 26 to the receiving relay 28.

The operation of the system shown in Fig. 1 is as follows: Let it be assumed that signal voltage of the form shown in curve A, Fig. 3, is impressed at the distant station upon the line 5. Such a signal is representative of those transmitted by the selective application of positive and negative impulses to the line, each character being represented by the resultant current extending over five units of time. In the case illustrated a positive impulse extending over one unit of time is followed by a negative impulse one unit in length, and this in turn by a positive impulse three units in length. The armature of the neutral relay 6 has a tongue contact which will impress positive or negative potential upon the ring 14 in accordance with the direction of current through the relay.

Upon the passage of the brush 10 over an odd-numbered segment, which brush is of course in synchronism with the transmitting brush of the distributor located at the distant station, the positive terminal of the split battery will be applied to condenser 16. This condenser will thus be charged positively with respect to ground, and this charge will be retained until the discharge circuit thereof is completed by the passage of brush 11 over an even-numbered segment of the set $T_1$.

This charging path will be from the lower portion of the split battery controlled by relay 6, through the tongue of that relay to solid ring 14, through brush 10 to segment 1, condenser 16 of the batteries 50 and 51 to ground, and back to the charging battery. The effect of batteries 50 and 51 may be neglected due to their similar association with the condenser during both charging and discharging periods.

The other curves of Fig. 3 represent the voltages at various stages of transmission of the signal through the apparatus shown in Fig. 1. Curves B and C show the terminal voltages of condensers 16 and 18 respectively. Charging periods $c$ alternate with discharge periods $d$. The term "discharge period" is used to denote the period during which the condenser is connected to the grid of an associated amplifier. As a matter of fact very little discharge from the condenser will take place during the so-called discharge periods because of the high resistance of the discharge path between the grid and filament. In drawing the curves, the resultant slight fall in the condenser voltage has not been taken into account. The distortion produced by this voltage fall is considered negligible. The effect of the spaces between conducting segments of the distributor is likewise neglected, since the error introduced into the shape of the curves by this omission is inappreciable. As is customary in synchronously operated distributors of this type, the angular adjustment of ring R with respect to the corresponding transmitting ring would be such that the small amount of distortion in the incoming signal, such as that introduced by chatter of the relay, would be impressed upon the receiving ring at the instant when the brush is between the conducting segments. The present invention, however, is not concerned with this adjustment. Curve D represents the sum of the discharge periods of curves B and C.

As brush 10 passes off from segment 1, condenser 16 is disconnected from solid ring 14 but retains its charge until brush 11 passes upon segment 2 of section $T_1$, when it is electrically associated with the grid 20 of amplifier 15. Because of the high impedance of the space between the grid and filament, the condenser still retains its charge as shown by the first discharge interval of curve B. During this same interval brush 10 passes over segment 2 of section R, producing a voltage across the condenser 18 in the opposite direction from that of the first charging interval of condenser 16, the charging battery now being the upper portion of the split battery controlled by relay 6. But assuming, as was done in drawing the curves, that the line was negatively energized prior to the transmission of the five unit signal combination shown, the condenser 18 already has a negative charge. This is shown in the first two time intervals of curve C. As brush 11 passes off from segment 2 of section $T_1$ and on to segment 3, brush 12 of section $T_2$ passes upon segment 3 of that section, which associates condenser 18 with grid 20 of amplifier 17. From this description it will be obvious how the remaining portion of curves B and C represent the terminal voltages of condensers 16 and 18 respectively during the remainder of the time indicated. Curve B is shown as extending one unit of time beyond curve A for the reason that the complete reproduction of the signal involves a discharge of whichever of the condensers has been charged during the previous time interval. It will be noted that curve D is therefore displaced one time interval to the right of curve A. This displacement corresponds to the time of storage.

As previously explained, the initial potential of each of the grids of amplifiers 15 and 17 is so adjusted that the electromotive force impressed upon the cable is zero. Curve E represents the cable terminal voltage produced by the sum of the condenser discharge voltages which is also the impressed amplifier input signal voltage as indicated in curve D. The cable terminal voltages are seen to be a distorted representation of the signal. As explained above, the function of the correcting network including impedances 52, 53, 54 and 55 is to correct for this distortion. The voltage across the input of transformer 40 is shown in curve F. Curve G represents the corresponding voltage across the secondary of transformer 40, that is, the voltage impressed upon amplifier 27. The balanced amplifiers 25 and 26 are associated with the neutral pole-changing relay 28 in such manner that no current from the space discharge battery normally passes therethrough. The balance is disturbed first in one direction and then in the other by the amplified impulses represented by portions $p$, $q$, (curve G) causing the armature of the relay to move first in one direction and then in the other. Curve H represents the voltage impressed on ring 29.

The arrangement shown in Fig. 2 is a modification of Fig. 1 in that the apparatus required has been minimized. In this arrangement but one audion or electric discharge device is utilized. This is accomplished by having the even numbered segments of the set designated by the character R connected together, the entire group being connected with the condenser 34. The other terminal of the condenser 34 is in turn conected with the heated filament of the audion 32. The oven numbered segments, as in the previous case, are also connected in a group, the entire group being connected with a condenser 35. In order that the respective condensers will be alternately connected with the grid electrode 20 of the tube 32, this electrode is connected with the solid ring of the set designated by the character T, while the ondensers 34 and 35 are connected with even and odd numbered segments respectively. Thus upon the passage of the brush 37 over the segments with which it is associated, the condenser connected to the corresponding segment will be charged in accordance with the operation of the line relay 6. Upon the passage of the brush 38 over a segment to which this condenser is also connected, a discharge circuit therefor is completed. The charge on the grid electrode 20 will thereupon be varied in accordance with the polarity of the charge on the condenser 34. Signal current impulses are thus caused to flow in the cable, the polarity of the impulses depending upon the character of the received signal.

It is, of course, understood that synchronism between the receiving and sending stations is maintained by any of the well-known means employed in printing telegraph systems.

Although the invention has been shown as applied to a system utilizing the five unit code, it is obvious that it is also applicable to other types of systems without departing from the spirit and scope of the invention.

What is claimed is:

1. In a repeater system, the combination with a plurality of line sections, repeating means connected intermediate said line sections comprising an electric discharge device having an anode, a cathode and a control electrode, a condenser arranged to be charged in accordance with the signal current impulse transmitted over one of said line sections, and means for subsequently connecting said condenser in circuit with the control electrode of said device for permitting said condenser to discharge and cause a corresponding signal to be repeated to the other line section.

2. In a repeater system, the combination with a plurality of line sections, repeating means comprising an electric discharge device having an anode, a cathode, and a control electrode, a condenser connected with said cathode, means for effectively charging said condenser in accordance with the signal current impulse transmitted over one of said line sections, and means for subsequently connecting said condenser in circuit with said control electrode for rendering said device operative to repeat to the associated line a corresponding signal current impulse.

3. In a repeating system, the combination with a land line and a submarine cable, repeating means interposed between the ends of said land line and submarine cable comprising a repeater of the audion type having an anode, a heated cathode and a control electrode, a distributor having a plurality of segmented divisions, and a condenser common to a plurality of the segments in each of said divisions adapted to be charged in accordance with signal current impulses and subsequently associated with said control electrode for rendering said repeater operative to repeat signal current impulses from said land line to said submarine cable.

4. A telegraph repeating system comprising a land line and a submarine cable, a plurality of repeaters of the audion type interposed between the ends of said land line and submarine cable, having an anode, a heated cathode, and a control electrode, a condenser associated with each of said repeaters, a source of current, a distributor provided with a plurality of segmented divisions arranged to alternately connect said source of current with said condensers, and to subsequently connect the respective condensers with the control electrode of the associated repeater for effecting the transmission of the corresponding signal over said cable.

5. A telegraph repeater system comprising a land line and a submarine cable, a plurality of electric discharge devices connected intermediate the ends of said land line and submarine cable, having an anode, a heated cathode and a control electrode, a distributor consisting of a plurality of segmented divisions, a condenser associated with each of said devices and connected with alternate segments of one of said divisions, a source of current, means for connecting said source of current with said condensers in accordance with the signal current impulses transmitted over said land line, and further means forming a part of said distributor for connecting said condensers with the respective control electrodes in the order in which they are charged for rendering said devices operative to repeat the corresponding signal current impulse to said cable.

6. In a telegraph repeating system, the combination with a land line and a submarine cable, repeating means interposed between the ends of said line and cable comprising a pair of electric discharge devices of the audion type having an anode, a heated cathode and a control electrode, a condenser associated with each of said devices, a source of current, means for sequentially connecting said source of current with said condensers in accordance with the signal current impulses transmitted over said land line, and further means adapted to connect said condenser to the input circuit of said devices for causing the operation thereof to repeat in said cable a current impulse of a character corresponding to the impulse transmitted over said land line.

7. In a repeating system, the combination with a plurality of line sections, repeating means comprising an electric discharge device having an anode, a cathode and a control electrode, a distributor having a plurality of segmented divisions, and impulse storage means common to a plurality of segments in each of said divisions adapted to be controlled in accordance with signal current impulses and subsequently associated with said control electrode for rendering said repeater operative to repeat signal current impulses from one to the other of said line sections.

In witness whereof, I hereunto subscribe my name this 13th day of October, A. D. 1920.

ALLISON A. CLOKEY.